US008386301B2

(12) United States Patent
Rajasingham

(10) Patent No.: US 8,386,301 B2
(45) Date of Patent: Feb. 26, 2013

(54) PROFESSIONAL COLLABORATION NETWORKS

(76) Inventor: Arjuna Indraeswaran Rajasingham, Bethesda, MD (US)

( * ) Notice: Subject to any disclaimer, the term of this patent is extended or adjusted under 35 U.S.C. 154(b) by 1812 days.

(21) Appl. No.: 10/790,151

(22) Filed: Mar. 2, 2004

(65) Prior Publication Data

US 2004/0176993 A1 Sep. 9, 2004

Related U.S. Application Data

(60) Provisional application No. 60/450,682, filed on Mar. 3, 2003.

(51) Int. Cl.
*G06Q 10/00* (2006.01)
(52) U.S. Cl. ...................................................... 705/7.38
(58) Field of Classification Search .................. 705/7.38
See application file for complete search history.

(56) References Cited

U.S. PATENT DOCUMENTS 5,862,223 A * 1/1999 Walker et al. ................... 705/50
6,892,179 B1 * 5/2005 Zacharia ........................... 705/10
7,143,052 B2 * 11/2006 LaSalle et al. ................ 705/7.33
7,249,034 B2 * 7/2007 Schirmer et al. ............... 705/344
2002/0078003 A1 * 6/2002 Krysiak et al. ..................... 707/1
2003/0018585 A1 * 1/2003 Butler et al. ...................... 705/53

OTHER PUBLICATIONS

Eric Lesser and Larry Prusak, Communities of Practice, Social Capital and Organizational Knowledge, IBM Institute for Knowledge Management, Aug. 1999.*
Giorgos Zacharia, Alexandros Moukas, and Pattie Maes, Collaborative reputation mechanisms for electronic marketplaces, Decision Support Systems, vol. 29, Issue 4, Dec. 2000, pp. 371-388.*
Stanley Wasserman and Katherine Faust, Social Network Analysis: Methods and Applications, Cambridge University Press, 1994.*
Josep M. Pujol et al., "Extracting Reputation in multi Agent systems by means of Social Network Topology." Copyright 2000 ACM, pp. 1-8.*

* cited by examiner

*Primary Examiner* — Jonathan G Sterrett

(57) ABSTRACT

Methods and systems for making decisions and risk mitigation for professional contracts and related collaboration. The use of a Collaboration Network is used with one or more Trust Layers and Professional layer to identify matches for collaboration separately on professional reputation and on integrity.

20 Claims, 35 Drawing Sheets

Professional Collaboration Networks

VIRTUAL INCUBATOR

CREATING THE
PROFESSIONAL
COMMUNITY

Fig 2

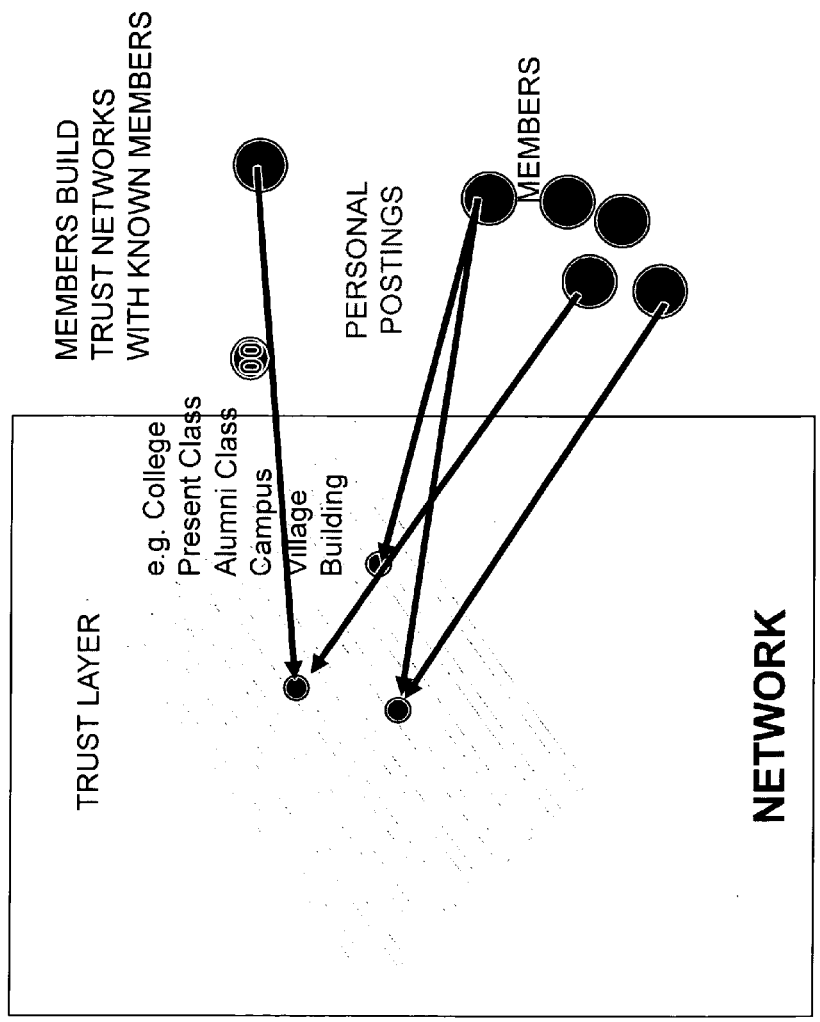

Professional Collaboration Networks – Venture Synthesis 07

EXAMPLE 

Screens
Post to Trust network of choice. Personal dialog

Screen for Member posting in routine dialog in network

Note: These can be from outside networks that mesh with the same members of the PCN. Databases with common tables can be used for this. Fees can be charged by the outside network for the use of its structures and by the PCN for benefiting the members of the outside network.

Fig 5

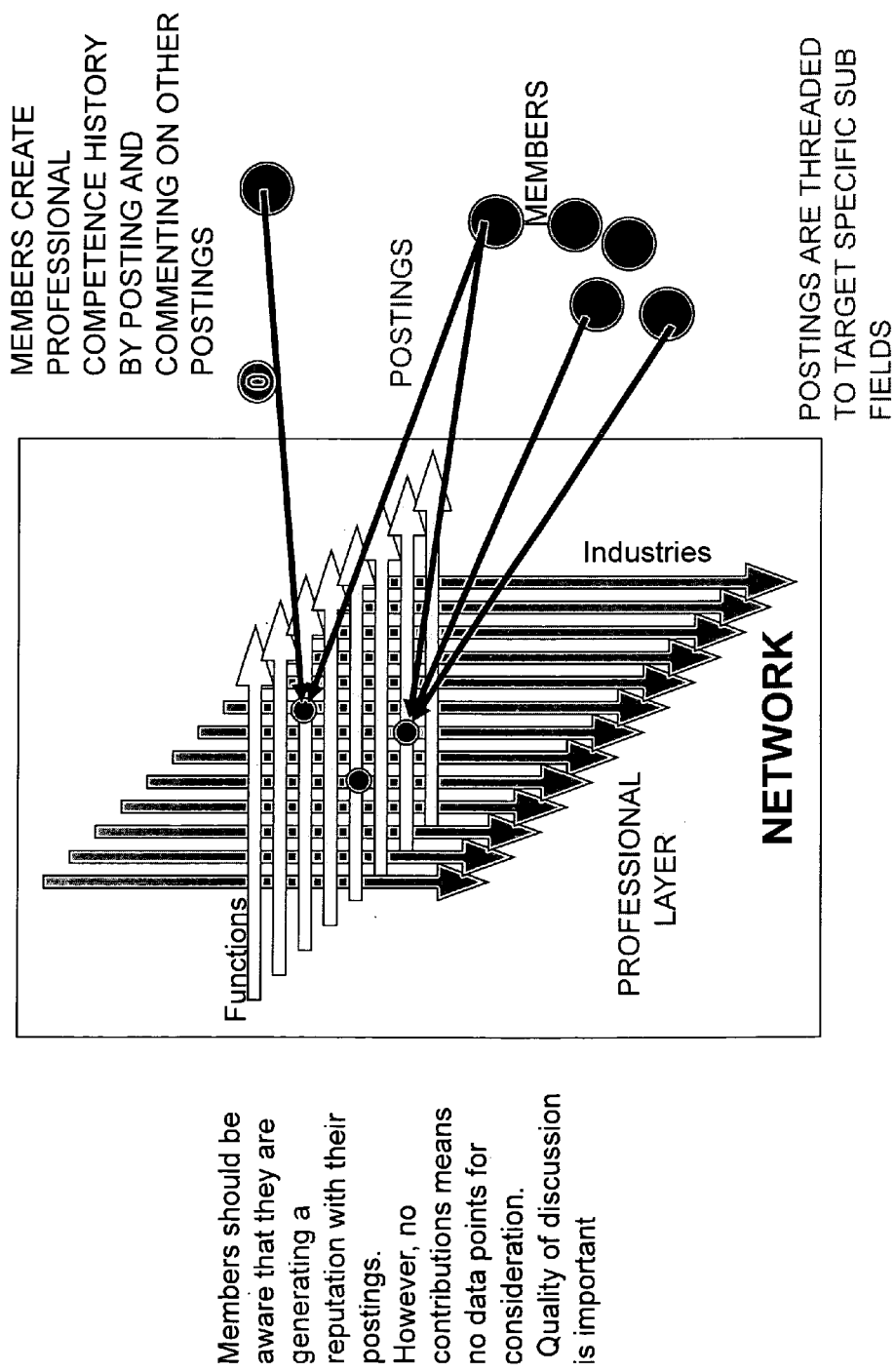

Professional Collaboration Networks – Venture Synthesis 07

EXAMPLE ⊚

Screens
Choice of industry and sub specialty that can be added to if desired.
Choice of functional area and sub area that can be added to if desired
Note: An alternative model uses an attribute space for the posting and responses.

Comment or posting body

Screen for Member posting in routine dialog in network

Note: postings can also be for a specific task or question that respondents can directly bid to solve for a fee, through the PCN, with PCN posting of response delayed till fee is paid by originator. Otherwise non fee demanding responses will be posted by PCN. Relevence iin solving problem can be used later in PCN as a reputation data point by "E".

Fig 7

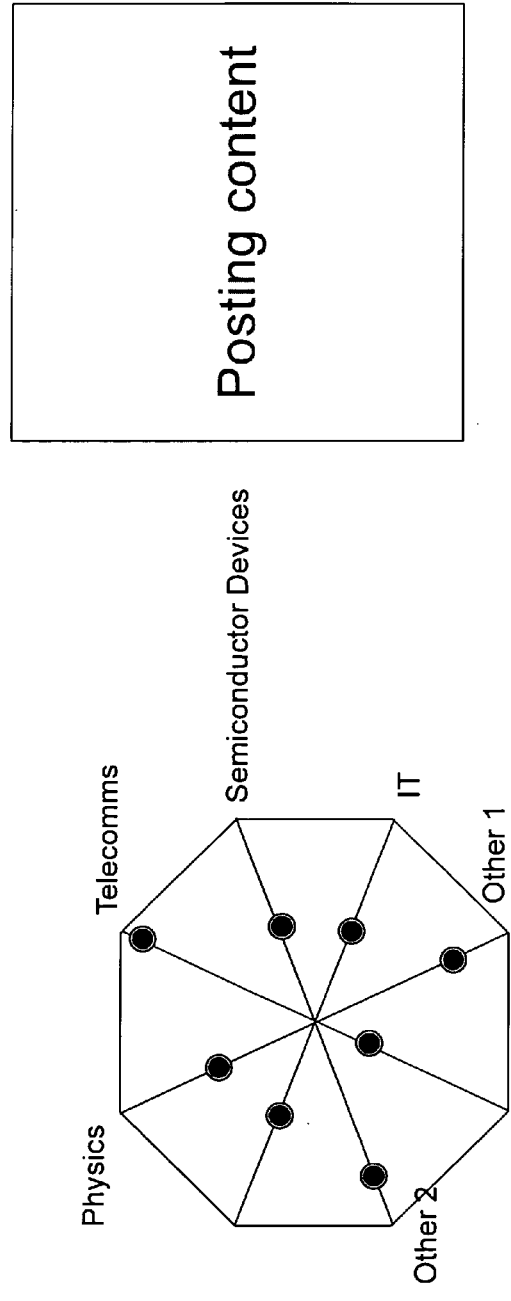

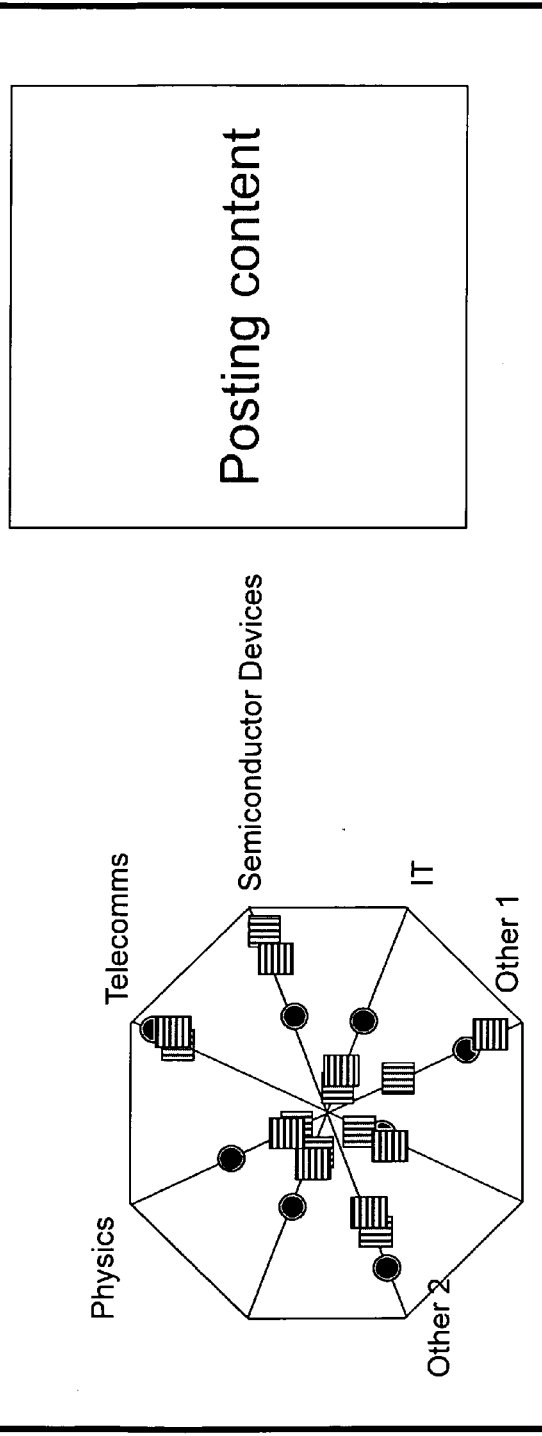

Professional Collaboration Networks – Venture Synthesis

EXAMPLE ◉ Creating and developing a product space for characterizing net interactions 04

The transaction tree - each branch will have a attribute space trajectory

Each thread will develop a branch of the transaction tree. Each node in each branch will have a location in the attribute space. Earlier termination of a thread will be a signal of relevance to solving the problem and in turn the professional reputation of the contributor.

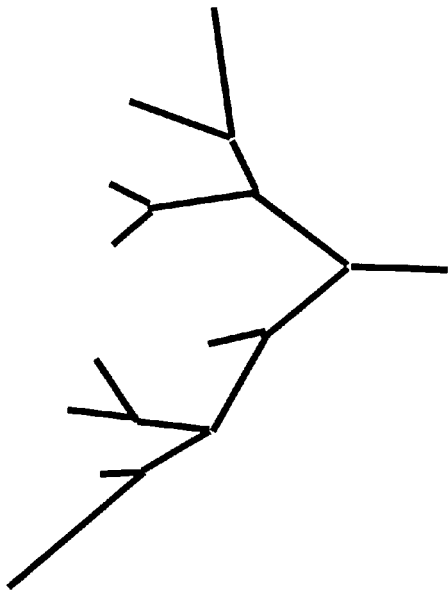

Fig 11

CREATING THE LEGAL STRUCTURE

Fig 13

Professional Collaboration Networks – Venture Synthesis 07

EXAMPLE ①

Decision support
Legal Structure

Screens
Series of screens that help entrepreneur define the requirements of the legal entity from tax, liability exposure and participants
Fee paid for service.
Screens allow selection of multiple legal vendors.
Each vendor will display options and why.
Each vendor will have a rating from past users polled after set up of entity.
Each vendor will have a disclosed fee.
Vendor will pay PCN a fee.

Note: An analogous process can be conducted for Intellectual Property with a forum for legal resources that can bid for the job.

Fig 15

BUILDING CORE COMPETENCES

Generate Bids

Fig 16

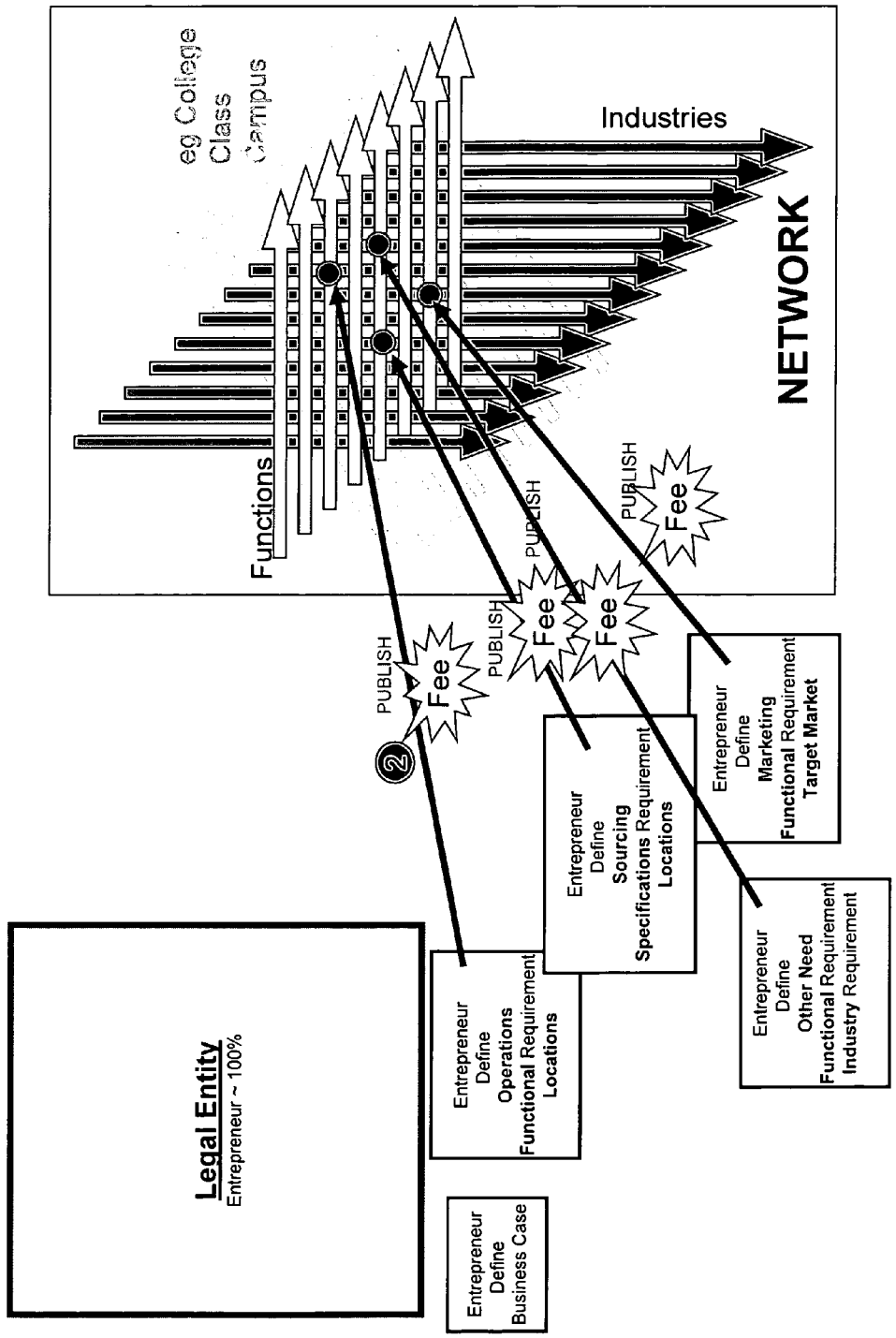

Fig 18

Professional Collaboration Networks – Venture Synthesis

Publish Requirements
For functional/ Industry specific Support
Equity/Wage/contract

EXAMPLE ②

Screen
Screen allows selection of specific industry and functional area intersection nodes for publishing the task/job requirement.
Multiple nodes can be selected.
Entrepreneur (E) defines the scope and defines a reservation equity (max) or wage(max) (not published to recipients Recipients are notified of the existence of a reservation equity /wage, and notified of meeting this when met with their bids )

E may pay an equity or cash or other fee to PCN on submission.
(PCN generates non disclosures for all future disclosures to become binding when a bidder decides to view the offering.)

Professional Collaboration Networks – Venture Synthesis

Bids are made by members.
Equity bid or wage/contract terms

EXAMPLE (3A)

Screen from bidders initially to E

1. Shows each bid (sortable by cost or other parameters) – 3A
   - E can choose bidders ( for a possible fee from PCN ) with bid parameters - equity or fees or wages.
   - (RESPONSE MAY FOLLOW ADDITIONAL DILIGENCE – 3B)

Fig 20

BUILDING CORE COMPETENCES

Diligence

Fig 21

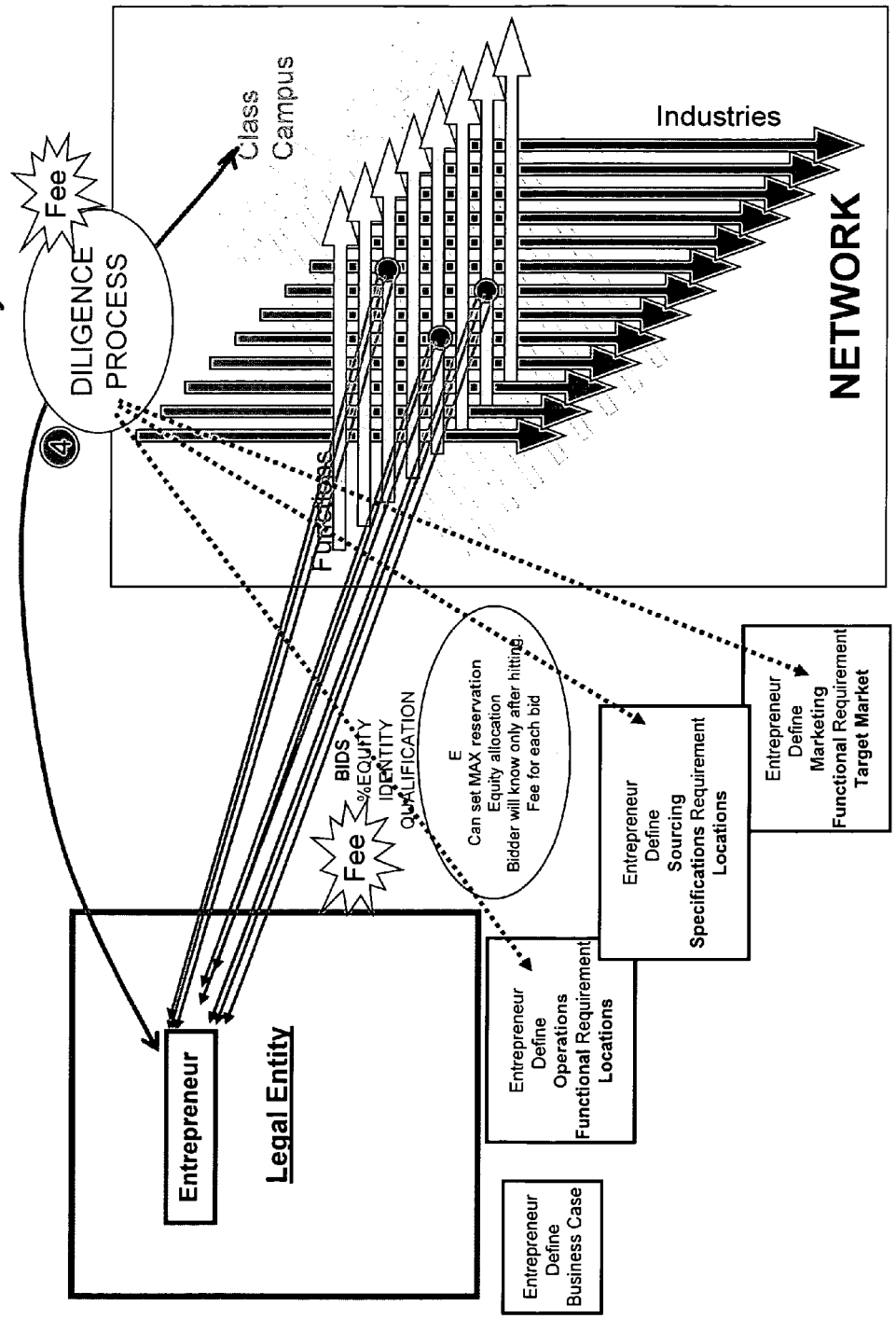

EXAMPLE 4A Professional Collaboration Networks – Venture Synthesis
DILIGENCE

Process for diligence displayed on E's screen

TRUST EVALUATION with VALIDATION

1. TRUST LAYER (TL) or a part of it is broadcast (multiple TLs are possible) - who has bid for job. (fee to PCN from E possible)

- Any member of TL can provide a "reference" (+ or -) to E (possibly for a small payment by PCN/E to the referee) if accepted (fee to PCN from E). BIDDER gets notification of referee and can notify on the same reference, bidders relationship to referee (adverse or constructive). Both the content of the references and the number of adverse relationships can be useful inputs to E.
   - If E chooses it can broadcast a request for references for level 1 referees by level 2 referees Parties known to referee (level -1) can respond direct to E ( and so on for any number of levels either as a single step that the PCN generates requests for as it receives new referees, or manually as the E decides when to ask for higher level referees.
   - Level 1 referees can also flag to TL that they are level (1) and can invoke level (2) parties that can validate level (1)s etc for multiple levels.
   - E needs to close the loop on Trust references to him/her self and may initiate a backward chaining of references that get 2nd level....nth level references, some of which are known directly to the E.
   - A forward chaining of interviewing each of the referee links can be initiated by the E to get to the bidder.
   - The +/- overall reference is saved for each reference in PCN and a score of the referees over time is generated from the matching percentage of + references to accepted bids from the subject of the reference. ( If multilevel reference the success of the next higher level referees) to generate a reputation of reliability for each referee in future transactions – potentially viewable by E 2. TRUST LAYER (TL) network structures are used to identify communication linkages and strength of communications between members and therefore create a tree –backward chaining the respondent to the persons with strong links to E in at least one TL. The E can then forward chain through these nodes and request references only from those with linkage connections to the subject/respondent.

3. Any of the referees can also sell guarantees on the reputation of the higher level referees or the bidder. These may in addition be underwritten by a financial institution ( or even on a credit card in some cases). These may be stronger signals of support for the subject of the reference. (E's screen may show some nodes representing referees with guarantees in a different color or representation). Guarantee will usually be for integrity as defined between E and the bidder. THE PCN may generate the binding legal contracts for this. The E can accept multiple offers to cover risk. Automated legal contracts generated for counterparties

Fig 23

Professional Collaboration Networks – Venture Synthesis

EXAMPLE 4B2  DILIGENCE

Process for diligence displayed on E's screen: E can initiate the following and view responses

PROFESSIONAL EVALUATION 2 with possible EXTERNAL EXPERT VALIDATION

2. Entire PROFESSIONAL LAYER (PL) NETWORK is broadcast with who has bid for job.

- Any member of network can provide a "reference" (+ or -) to E (potentially for a small payment by PCN/E) if accepted (potentially for a fee to PCN from E). BIDDER gets notification of referee and can notify on the same reference bidders relationship to referee (adverse or constructive). Both the content of the reference and the number of adverse relationships as noted by Bidder can be useful inputs to E. Referee may also stay anonymous and have 2nd level referees referee him with disclosed identities. It may also be multiple level undisclosed and disclosed at the final level. If all levels are undisclosed we may have guarantees to help the decision or Professional External validator at the final level to help the decision.

- If there are 2nd level and 3rd level ...nth level evaluations of referees by those who know the referee at the higher level (eg level 3 who know level 2) and the same structure for evaluation of the bidder can be applied to the referees. This process for each of the referees is broadcast on the PL when requested by E (potentially for a fee to PCN) The referees of referees can also be paid a small fee for their contribution by E/PCN through PCN) The +/- overall reference is saved for each reference in PCN and a score of the referees over time is generated from the matching percentage of + references to accepted bids from the subject of the reference. (If multilevel reference the success of the next higher level references) to generate a reputation of reliability for each referee in future transactions – potentially viewable by E.

- Any of the referees can also sell guarantees on the subject. These may be stronger signals of support. (The E's screen can represent guarantees on any level of referee in a different color or other notation) Guarantee will usually be on action that is observable in a short time. The PCN generates the legal contracts for this. These may addition be underwritten by a financial institution even on a credit card.

Note: PCN Provides a network of "validators" (Field experts) to assess the professional interactions of the bidders or referees and/or evaluate bidders for job/task (for a fee to PCN). E can ask one or more Validators for an opinion.

Fig 25

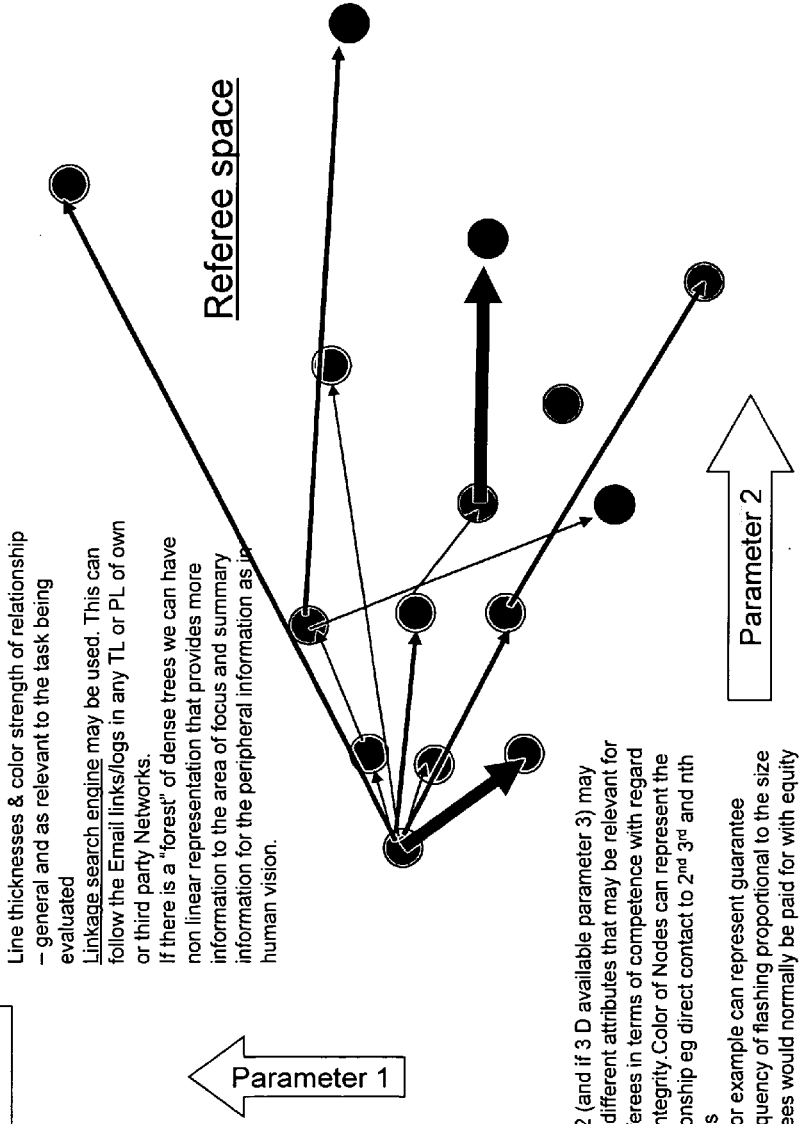

BUILDING CORE COMPETENCES

Finalizing Offers

Professional Collaboration Networks – Venture Synthesis

Bids are made by members.
Equity bid or wage/contract terms

EXAMPLE

Screen from bidders to E After receiving the First Bids and DILIGENCE

1. E can make a counter offer to selected candidates (binding on acceptance or binding on confirmation of acceptance-to allow multiple concurrent counter offers ) each transaction can have a fee to the PCN.
2. These can be responded to by the bidders.
3. Multiple offers and counter offers would normally be possible before concluding arrangement with meetings if necessary. PCN has legal arrangement executed to have fees/equity on fruition of arrangements.

FINANCE

Using PCN resources
For negotiation

Fig 29

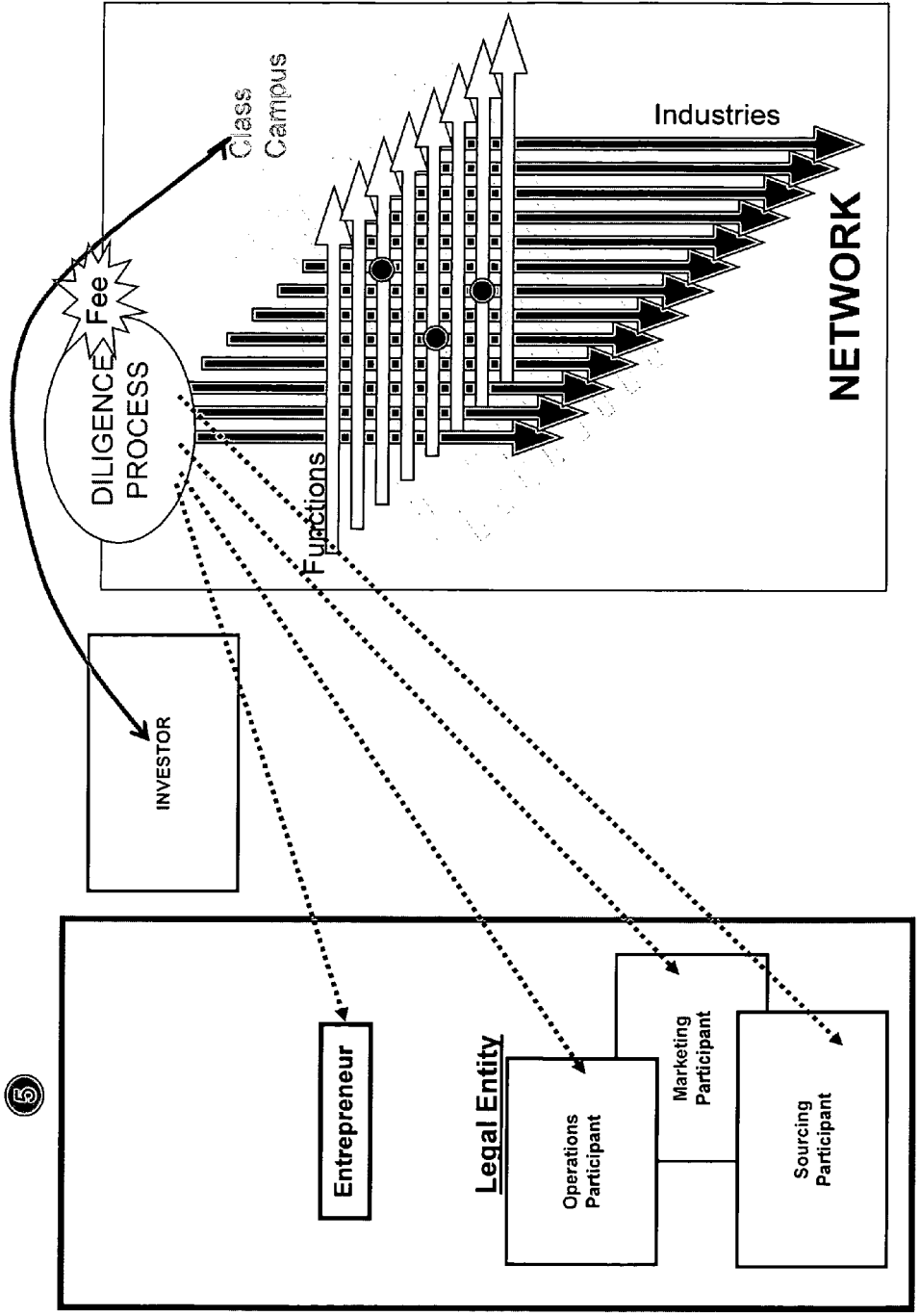

Professional Collaboration Networks – Venture Synthesis 06

EXAMPLE ⑤

Screens from PCN for VC ( or other investor) After request for Funding by E

1. After selecting the team the process is repeated for VCs. The VCs can use the same TL and PL of the PCNs if they themselves are members.
2. The E can use the information that he gets in the diligence process with multiple opinions to be used selectively by E for the VC negotiation.
3. Note that if VCs are members of the same PCN either PL, TL or both, they will have the broadcast info.
4. They too can get references of multiple levels to give the E.
5. VCs can pay PCN to be on the forum of VCs to have the opportunity to bid through PCN and use PCN information.
6. Information generated by E may be protected in some models for E's use only. VC can however generate its own queries to do its diligence on the E and the successful bidders for E's venture using the same process as E with similar screens (usually for a fee)

Note: any investor can take the role of the VC here (eg angels)
Moreover after the venture is commenced business partners suppliers and market participants can be reviewed using the PCNs of which these parties are members. There can be PCN to PCN relationships that have economic exchanges that relate to the economic value one PCN provides to another in developing ventures and other relationships.

Fig 31

Professional Collaboration Networks – Venture Synthesis

Examples of PCN Fees

- Equity based on Venture
- Mixed Cash/Equity on Venture
- Senior Claim on Venture
- Credit

Fig 32

PCN IMPLEMENTATION

A possible implementation of PCN

With

Heirarchy PCN-Web

&

PCN-Sub.Web

Fig 33

Example of Professional Fields

| Field Discipline |
| --- |
| Agriculture |
| Automotive and Aerospace industries |
| Bio-Sciences & Medical Technologies |
| Chemicals and Pharmaceuticals Industry |
| Chemistry |
| Civil Engineering, Architecture, Real estate development |
| Commercial Law |
| Computing and Computer Science |
| Electronic components and subsystems |
| Engineering Consulting |
| Entertainment and Gaming industry |
| Entrepreneurship and New Ventures |
| Finance – Investment Banking |
| Finance – Investments, Sales and Trading |
| Finance - Venture Capital |
| IT industry |
| Management Consulting |
| Mathematics |
| Mechanical Engineering Design |
| Mechanical Engineering Operations/Operations Research |
| Medicine, Nutrition |
| Metallurgy, and Material Sciences |
| Mining industry |
| Naval Architecture |
| Physics |
| Public Law & Government |
| Retail |
| Semiconductors/ Telecommunication Components |
| Software - General |
| Telecommunications/Networking |
| Textile industry |

Fig 35

PROFESSIONAL COLLABORATION NETWORKS

CROSS REFERENCE TO RELATED APPLICATIONS

U.S. 60/450,682 filed Mar. 3, 2003

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

Field of Invention

Generation of entities to create economic value as in corporations, represent the aggregation of complementary skills and visions that create products that are expected to have a value to a set of markets that is greater than the cost of the utilization of all of the constituent participants and the resources brought to bear on the products. In the past these entities were largely created by manual searches for suitable candidates in each functional area and industry area required for the product by entrepreneurs who used largely informal networks for this process.

The present invention creates a new paradigm for the creation of economic value generating entities by using Trust networks and Professional Networks. In many embodiments of the invention, these Trust and Professional networks are created by aspects of the invention.

SUMMARY

Objects & Advantages

The objects and advantages of the present invention relate to the creation of entities that can generate economic value by utilizing the structure and content of communications among members of networks that are created both for social and professional interaction. Such economic value in the present invention may for example relate to the creation of business entities or a new approach for matching job seekers to job offerings with information in normal interactions between members on one or more networks. The invention defines a new approach to creating the environment for such communications and also provides a process that uses existing networks as inputs for the process.

BRIEF DESCRIPTION OF DRAWINGS

FIGS. 1-35 provide slides that represent the process for building an example of the present invention.

DETAILED DESCRIPTION OF INVENTION

The present invention either uses a preexisting professional community or creates one or more such communities using the specialization and preferences of the members. These networks can result from professional organizations such as professional societies such as IEEE or Colleges and classmates in particular fields, Alumni of colleges, colleagues in profitable organizations, university staff and faculty etc. This forms the professional layer of the communities. There is in addition a Trust layer of the community that is created by the interaction of members of one or more networks that relate to personal relationships from prior or current contact in organizations or physical locations such as colleges, universities, alumni groups, companies, professional organizations, schools etc. The Trust Layer (TL) and the Professional Layer (PL) are parts of the Professional Collaboration Network (PCN)

The classification of the members into functional areas relevant for economic activity and industry groupings relevant for creating economic value is done to help focus dialog in the professional networks. Similarly the Trust networks get focus by segmentation in to the relevant groups that are interested in a dialog. For example class groups in an alumni Egroup.

Figure 1:
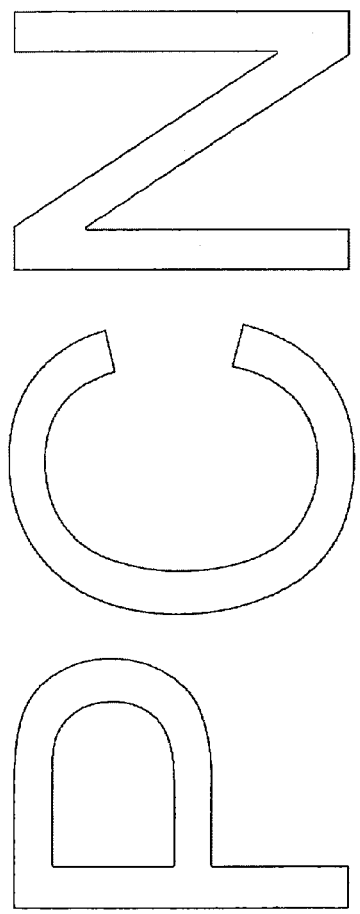
Figure 3:
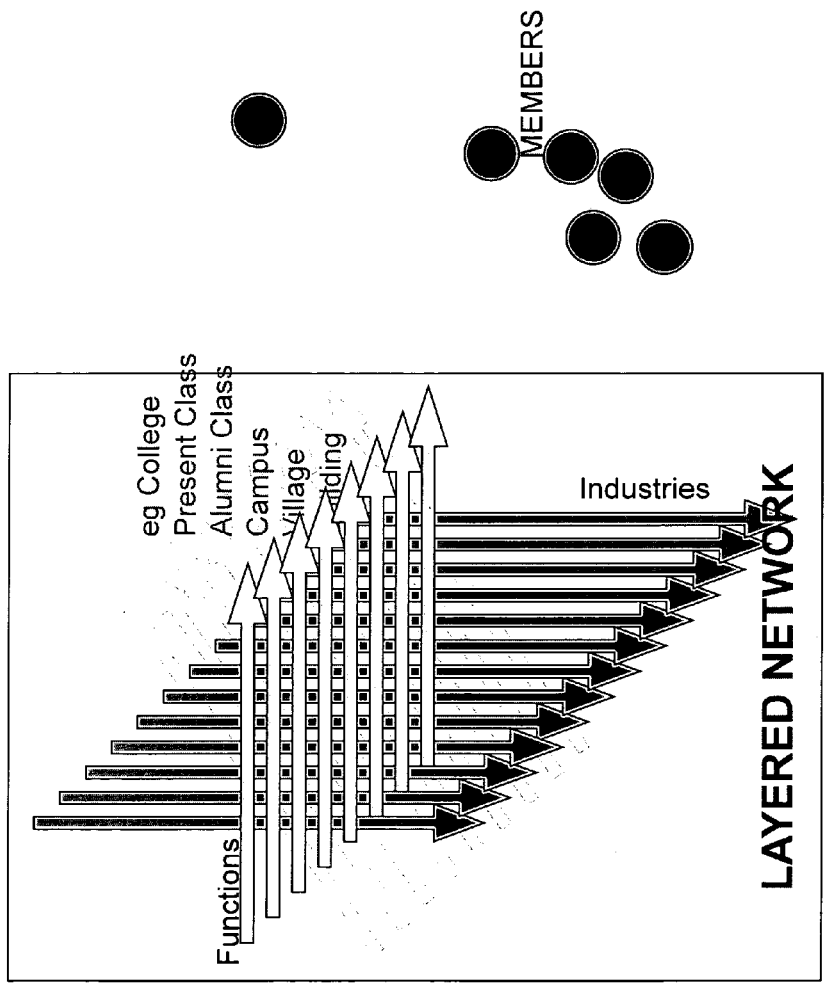
Figure 9:
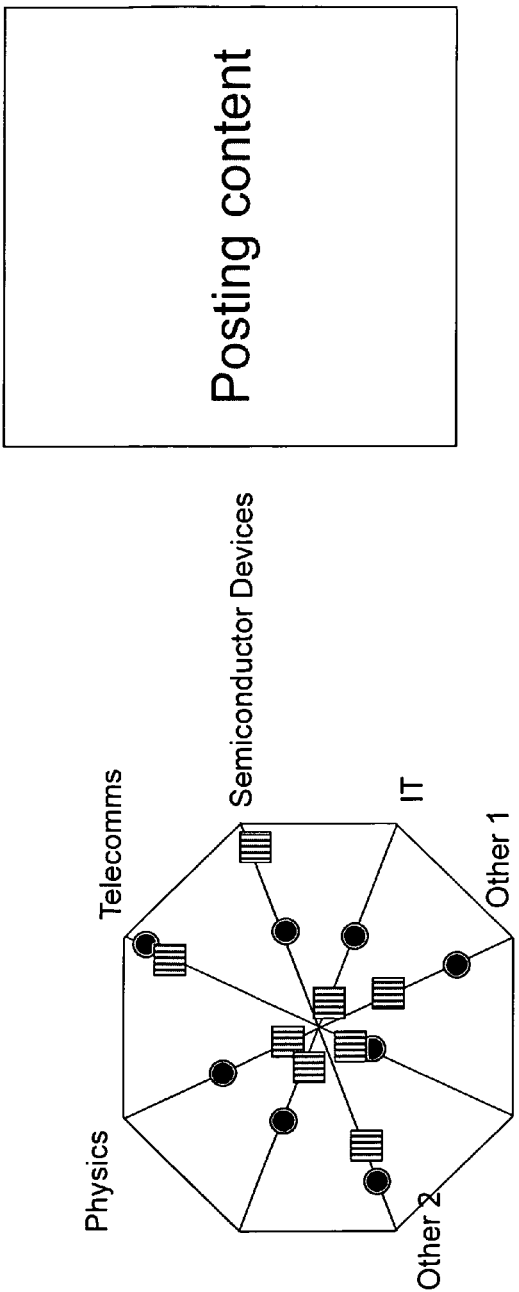
Figure 12:
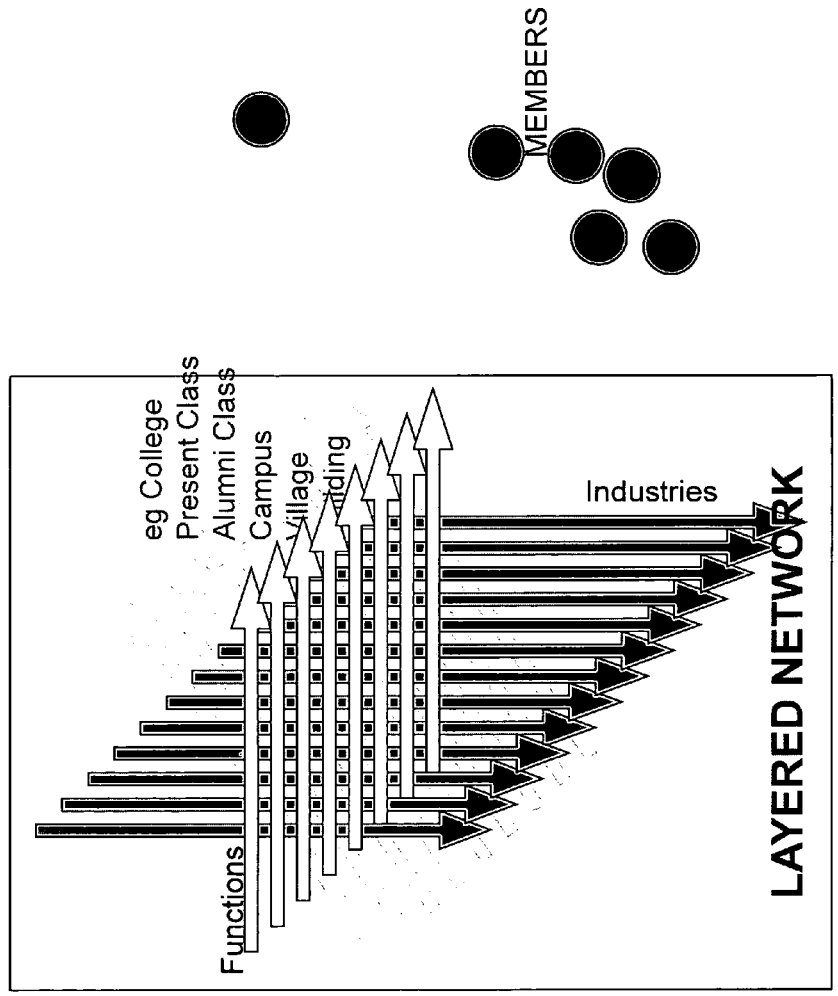
Figure 14:
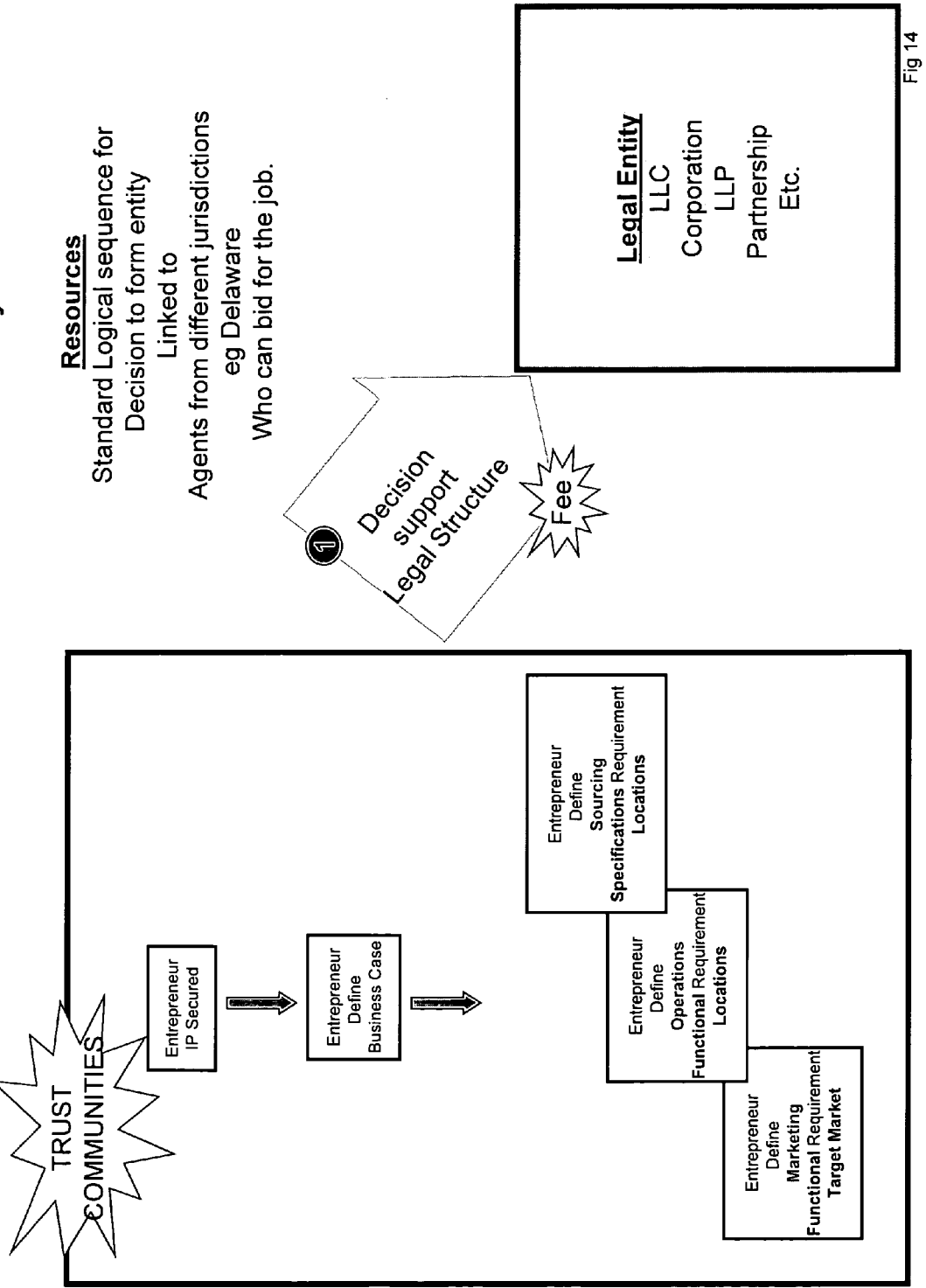
Figure 19:
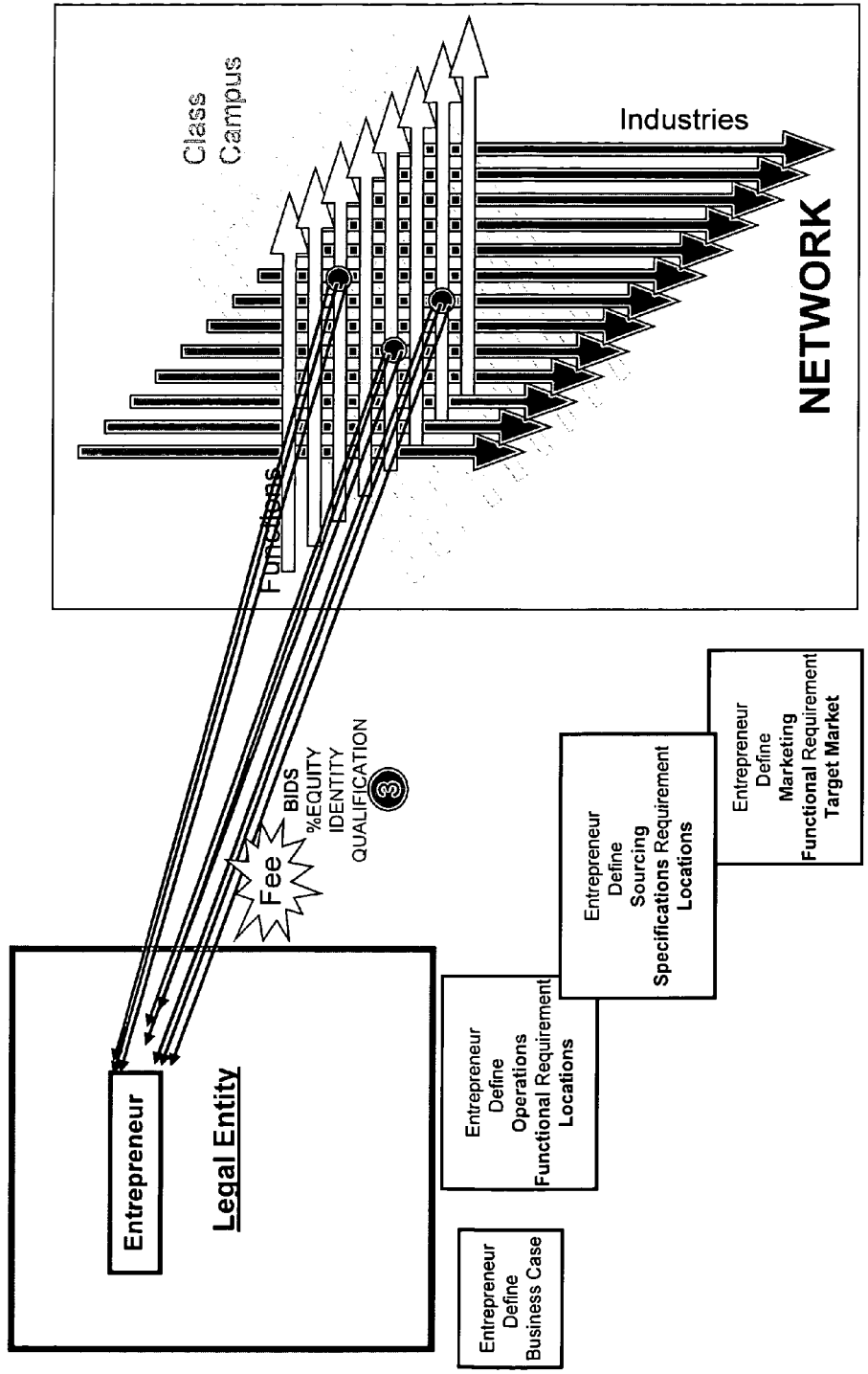

The professional networks may have a range of classification mechanisms for the threads of discussion and dialog that flows through the network. One example would be an item for posting in the professional network be classified by the originator to have a components in one or more industry field and at least one functional area that is relevant for the posting (FIG. 7). As responses are generated to the initial posting (FIG. 8) They are classified in an attribute space (axes and distances representing attributes), respondents are allowed to provide new combinations of the industry weightings for the response and the functional area if different to the original posting (FIG. 9, FIG. 10) and are noted in the attribute space. This will allow a tree of responses to develop where any branch of the tree may have a particular industry orientation with more industry specialists targeting a response (FIG. 11). The model can have fees for responses to the postings made by the PCN and partly paid to respondents. However, this may not be necessary as, another model can use the desire of the participants to create a reputation to drive their interest providing inputs. The originator may provide inputs on the relevance of the responses in resolving the issue originally posted.

These professional networks keep functioning to address specific queries of members and may have economics of their own in providing incentives for respondents. However, in addition they create a record of competence for each of the participants. This record can take many forms depending on the structure that is created for the interaction and the definition of the threads of discussion. Some examples are provided in the figures but they are by no means complete in terms of such structures. When a new venture or other entity is contemplated by an entrepreneur or even a existing entity that has job vacancies, such professional networks can be queried to provide the competence record of the members.

Figure 24:
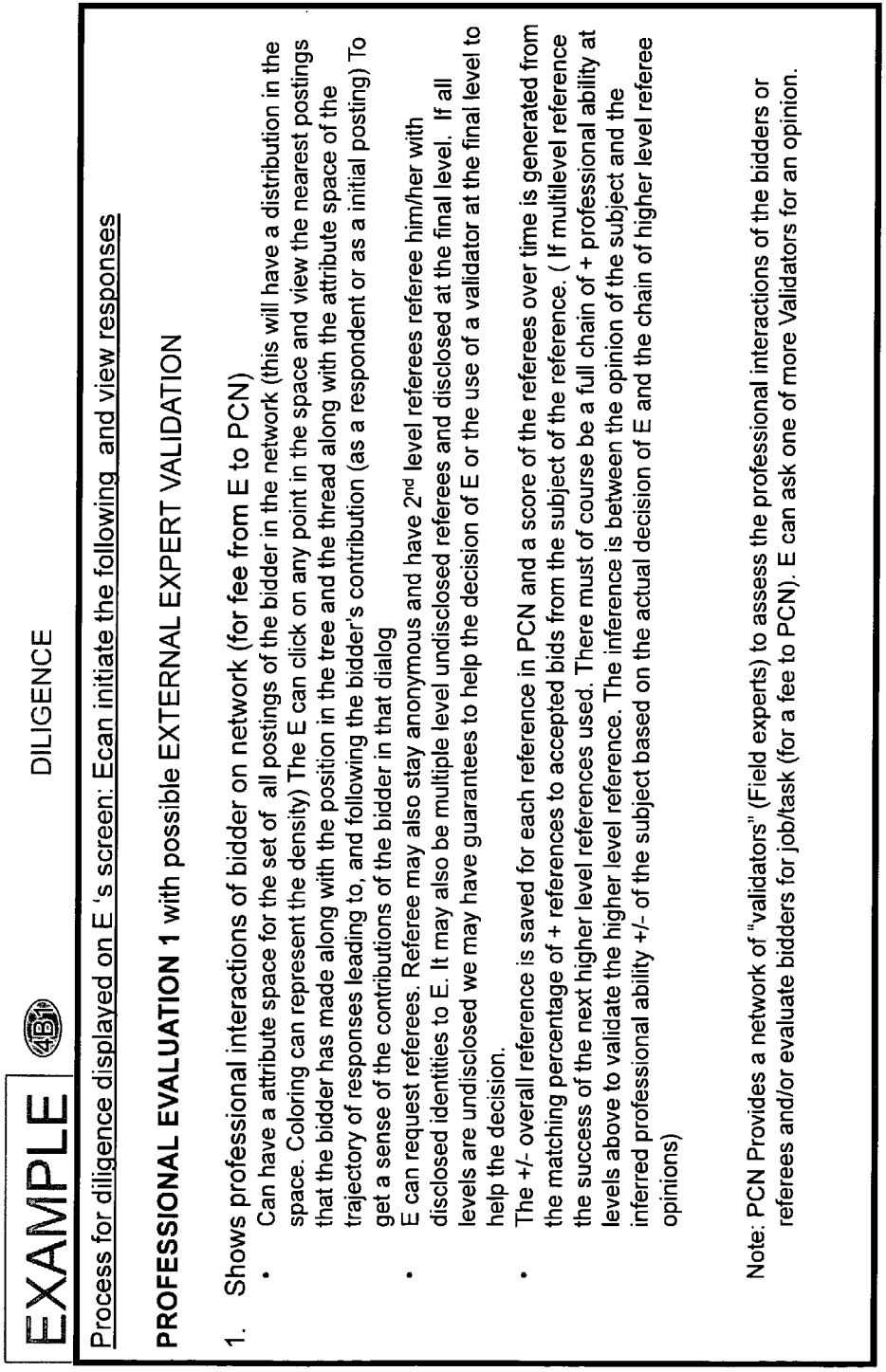

One possible structure for the Professional Layer is shown in FIGS. 24 and 25.

Process for diligence displayed on E's screen: Ecan initiate the following and view responses PROFESSIONAL EVALUATION with possible EXTERNAL EXPERT VALIDATION Professional Interactions of Bidder on Network (for Fee from E to PCN)

Professional layer has an attribute space for the set of all postings of the bidder in the network (this will have a distribution in the space. Coloring can represent the density) The E user) can click on any point in the space and view the nearest postings that the bidder has made along with the position in the tree and the thread along with the attribute space of the trajectory of responses leading to, and following the bidder's contribution (as a respondent or as a initial posting) To get a sense of the contributions of the bidder in that dialog E (user) requests referees. Referee may also stay anonymous and have $2^{nd}$ level referees referee him/her with disclosed identities to E. It may also be multiple level undisclosed referees and disclosed at the final level. If all levels are undisclosed we may have guarantees to help the decision of E or the use of a validator at the final level to help the decision.

The +/− overall reference is saved for each reference in PCN and a score of the referees over time is generated from the matching percentage of + references to accepted bids front the subject of the reference. (If multilevel reference the success of the next higher level references used. There must of course be a full chain of + professional ability at levels above to validate the higher level reference. The inference is between the opinion of the subject and the inferred professional ability +/− of the subject based on the actual decision of E and the chain of higher level referee opinions)

Entire PROFESSIONAL LAYER (PL) NETWORK is Broadcast with Who has Bid for Job.

Any member of network can provide a "reference" (+ or −) to E (potentially for a small payment by PCN/E) if accepted (potentially for a fee to PCN from E). BIDDER gets notification of referee and can notify on the same reference bidders relationship to referee (adverse or constructive). Both the content of the reference and the number of adverse relationships as noted by Bidder can be useful inputs to E. Referee may also stay anonymous and have $2^{nd}$ level referees referee him with disclosed identities. It may also be multiple level undisclosed and disclosed at the final level. If all levels are undisclosed we may have guarantees to help the decision or Professional External validator at the final level to help the decision.

If there are $2^{nd}$ level and $3^{rd}$ level . . . nth level evaluations of referees by those who know the referee at the higher level (eg level 3 who know level 2) and the same structure for evaluation of the bidder can be applied to the referees. This process for each of the referees is broadcast on the PL when requested by E (potentially for a fee to PCN) The referees of referees can also be paid a small fee for their contribution by E/PCN through PCN)

The +/− overall reference is saved for each reference in PCN and a score of the referees over time is generated from the matching percentage of + references to accepted bids from the subject of the reference. (If multilevel reference the success of the next higher level references) to generate a reputation of reliability for each referee in future transactions—potentially viewable by E.

Any of the referees can also sell guarantees on the subject. These may addition be underwritten by a financial institution even on a credit card. These may be stronger signals of support. (The E's screen can represent guarantees on any level of referee in a different color or other notation) Guarantee will usually be on action that is observable in a short time. The PCN generates the legal contracts for this.

Note: PCN Provides a network of "validators" (Field experts) to assess the professional interactions of the bidders or referees and/or evaluate bidders for job/task (for a fee to PCN). E can ask one of more Validators for an opinion.

Input to the Profession layer is enabled with User Screens (FIG. 7). Users of the Professional Layer can extract information from User Screens (FIG. 16, FIG. 18.). Bids may be posted with User Screens (FIG. 20).

In the past such "references" came from a forward search among individuals known to the originator of the search. Then to take advantage of the economies of scale in the relationships in each field search firms were set up to use relationships that can be reused for new relationships. Such search firms manifested themselves to some extent in Venture Capital Companies that used relationships in their data banks to create economic value over and above the capital they provided. The present invention provides a more powerful paradigm as both forward and backward searches may be conducted in the networks and the infrastructure for transactions may even be designed to provide the right parameters for measuring the performance of members when there is a search of a new business entity conducted by an entrepreneur or a job posting for a company.

In a similar vein there is a need for trust relationships or "personal references" for generating new relationships in a business venture or for that matter in hiring decisions. The structure of interactions in networks can get harnessed to provide key information in terms of the relative strength of relationships such as derived from the frequency of interaction between members or of interaction of members to groups that are responded to by other members. Such linkages can be connected to get to a set of relationships with the Entrepreneur or other searching party (E) and then a forward search from E conducted right through to the possibly several paths to the subjects of the search. There can also be information on the nature of the relationships in the networks that are made available. One possible structure for the Trust Evaluation may work as follows See FIG. 23:

1. The Trust Layer (TL) or a part of it (multiple TLs are possible) is broadcast:
    1.1. Any member of a TL can provide a reference to the E (+ or −) (possibly for a small payment of by PCN/E to the referee—if accepted—fee to PCN from E). Bidder (service provider) gets notification of Referee and can notify on the same reference Bidders relationship to Referee (adverse or constructive). Both the content of the reference and the number of adverse relationships can be useful inputs to E.
    1.2. E can choose to broadcast a request for references for level 1 Referees by level 2 Referees—Parties known to the level 1 Referee can respond direct to E (and so on for any number of levels either as a single step for which the PCN generates requests, as it receives new Referees, or manually when the E decides to ask of higher level Referees.
    1.3. Level 1 Referees can also flag to TL that they are Level 1 and can invoke Level 2 parties that can validate Level 1s etc for multiple levels.
    1.4. E needs to close the loop on Trust References to him/her self and may initiate a backward chaining of references that get 2nd level . . . nth level references some of which are known to E.
2. Any of the Referees can also sell guarantees on the reputation of the Referees or the Bidder. These may in addition be underwritten by a financial institution. (or even on a credit card in some cases). These may be stronger signals for support of the subject of the reference. (E's screen may show some nodes representing Referees with guarantees shown in a different color or representation)

Input to the Trust Layer is Enabled by User Screens (FIG. 5)

There is an issue of intrusion into privacy of the members. However, there can be disclaimers designed for members on entry to allow such information to facilitate such processes that such members can be beneficiaries of. For example, they could be paid by the PCN for allowing their interactions to be used in a search.

The above structure can be used as noted in a passive manner for a record of past actions of members of the PCN to provide inputs in a search. In addition there can be active interactions of members on request by the PCN for additional information or economic exchange. For example there can be referees at different levels as shown in the figures for both the TL and the PL that can be paid by the PCN or another agent through the PCN. In addition members who are knowledgeable about performance of members in a search may choose to provide performance guarantees to the searching party through the PCN thereby providing greater confidence to the E. Often such guarantees are more credible if underwritten by a credible financial institution. Such arrangements and the guarantee arrangements along with legally binding agreements in the relevant jurisdictions and locations of the members for all economic transactions may be generated and executed by the PCN.

The process of creation of a new venture by an E may start with the PCN providing a forum of Intellectual Property legal firms that offer services to the PCN member (potentially for a fee to the PCN). The E can then decide on one of these and then set up the IP requirements before creating a legal entity for operating the venture (such as a corporation or LLC etc) Again this can be done through a set of legal entities that provide such set up services in different jurisdictions available on the PCN (potentially for a fee to the PCN). Once the business plan is created by E (again resources for this can be provided through sets of consultants who execute non disclosures and operate through PCN for a fee as in the last two steps), there is a need to find members of a team for the venture. The PCN provides the channels for posting requirements, bidding for the process and providing the diligence and then finalizing the arrangements (all for a fee which can include equity in the entity, wage based compensation or other claims on the economic value created by the transaction)

Initially the E posts the requirements for each participant in the intersection of the relevant industries and the relevant functional areas. Reservation equity or wages or other terms may be provided to be explicit or available only on meeting the conditions for reservation being met. The respondents bid with identities and any additional information they wish to provide and granting permission if they choose to allow E to go through a diligence process on PCN.

The E then may go through both a Trust evaluation and a Professional evaluation of the candidates. One or more Trust Layers (TL) that the respondent is a member are notified of the member's interest and references are solicited. Such referees are backward chained to second, third and higher level references till a known or trusted party is found as a referee at some $n^{th}$ level trusted by the E. This will then permit a forward chaining of verification of trust relationships in the paths to the respondent from the E. All members connected together by a chain of linkages between pairs of members are part of a connected network. Every unique path along linkages between pairs of members with no linkage traversed twice is a connection thread.

A parallel channel would be the utilization of the strength of communication relationships which may be established with the frequency of communication between members or other criterion related to the strength of relationships between members. Such communications may be backward chained till the E is reached and then the E may choose to forward chain to verify the subject through the network. Notably, the communication network may be based on direct communications or communications to a sub network of any of the TLs and the response of other members to that communication.

Guarantees may also be provided for a fee with specific defined criteria that are triggers for payment.

Similarly the diligence process for Professional performance may be conducted with the E viewing (potentially for a fee) a communications distribution of the subject in the space of industries and the space of functional areas. He may click or otherwise select a point or a region of the space to investigate the competence of the subject. Such a selection may give the postings that the subject has made in the local neighborhood of the selection (the E can choose the size of the neighborhood) these postings will be classified in terms of the functional focus and industry focus and the context of each of these in terms of the trajectory of the prior and following postings in the thread in these spaces. It may also give the position on the tree of communications following the initial posting for each of these communications, to establish the relevance (early termination of a tree may be because an answer has been reached or because the branch has become irrelevant).

Furthermore the E can broadcast a request for referees that inhabit the neighborhoods that E has selected to provide references on the subject. PCN can provide a network of experts to evaluate the referees remarks or the subject. (for a fee. The experts may also be paid by PCN or be retained simply by generating a reputation for themselves) The bidder/subject will normally be informed of the request for references and the referees identities and be allowed to provide a perspective on that referee either positive or negative that is available to the E when evaluating the referee inputs.

There can be $2^{nd}$ $3^{rd}$ or higher order referees which can be evaluated by E or by experts. It is also possible to have first order referees to stay anonymous as long as they provide second order referees that evaluate them to disclose their identities. This argument may be carried to multiple levels of anonymous referees.

There may also be a background process for establishing the reputation of referees in providing accurate inputs by correlating the positive references to positive decisions by E or in the case of multiple level referees the next higher level referee success in prediction (chained back from the success of the E)

Any of the referees can also provide guarantees as in the TL related to a specific predefined trigger criterion to help the E in a decision.

The E may then finalize decisions on the bidders and if necessary counter offer and receive responses any number of times through PCN and arrive at a decision possible after meeting with the bidders.

The PCN may get a fee based on economic value of the entity created that may be equity or other claim on the entity such as a senior claim as in preferred shares etc or simply contingent claims on performance The next step is to attract finance to the entity. Here again the PCN may have a forum of investors that may be Venture Capitalists or Angel investors etc. Upon request by E to the Financier, the Financier may initialize a diligence process on PCNs that he is a member of to check each of the participants. The process is analogous to the process conducted by E for the other participants.

PCN can charge a different fee for this service to capital providers.

A second factor for this stage of the process is that the E can use the information that he has got in the diligence process he has conducted to selectively present what he chooses to the financier.

Implementation for a Geographically Distributed Membership

Figure 34:
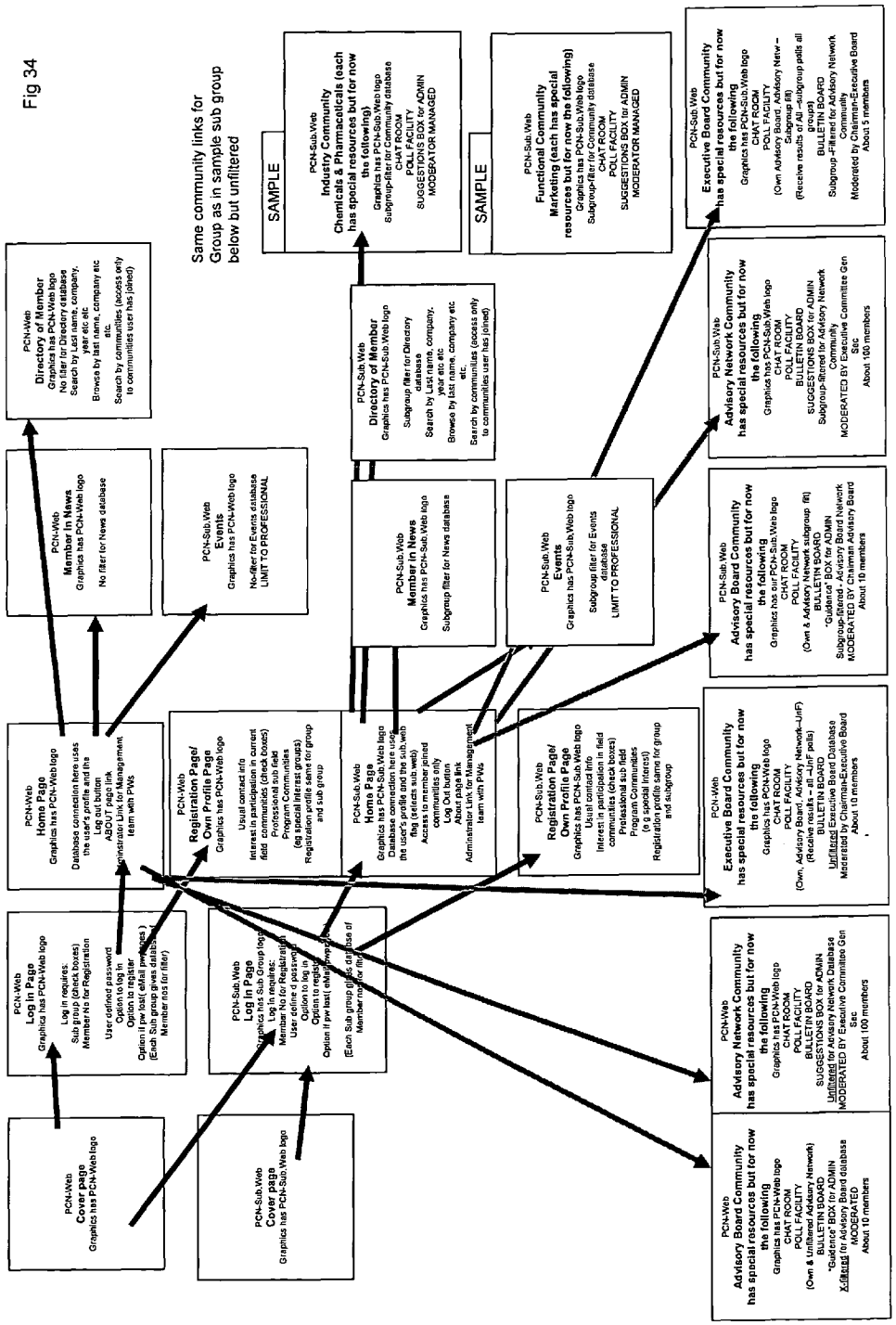

An embodiment of the invention for a geographically distributed membership with a Web implementation is illustrated in FIG. 34. It illustrates several user client screens for data input, and illustrates access to server databases for response to queries and browsing content. Databases may have common tables with outside networks (FIG. 5) to integrate them to the PCN.

FIG. 34 illustrates the entire group and a subgroup (which may or may not be a single location) with representative filters for the sub-group in database queries. The implementation also shows practical implementation issues including governance and management for the PCN with an Executive Board, an Advisory Board and an Advisory Network. Client User Screen (FIG. 5) are used for posting information by members.

The invention claimed is:

1. A method for business decision support using a web server and client user interfaces for performance evaluation of human resources comprising professional ability and trust, utilizing an information network with a plurality of members wherein said members comprise a First Member and a Second Member—with a Professional Collaboration Network with at least one Professional layer and at least one Trust Layer, comprising:

obtaining member information;

establishing a Professional layer based on the member information comprising disclosed professional ability and pairwise professional relationships with other members of the Professional Layer;

establishing a Trust Layer by utilizing a linkage search engine to identify linkages from member information comprising pairwise trust relationships with other members of the Trust layer from disclosed interactions between pairs of members resulting from prior or current personal contact;

iteratively using such linkages between members, to create a chain of trust linkages that generate at least one connected network of members as a subset of the Trust Layer with each of said connected networks comprising members connected to every other member in said connected network through a series of pairwise connections between members, wherein each of said connected networks comprise one or more connection threads each of which is a unique path along said pair-wise linkages between any two of said members with any one pair-wise linkage traversed only once;

identifying a Trust Reference for members of said Trust layer utilizing the chain of trust relationships along one or more connection threads;

accessing from the web server a Professional Reputation for at least one member, from the at least one Professional Layer with members wherein the professional ability of said members are assessed using third party knowledge of said members;

accessing from the web server a Trust Reference for at least one member from the at least one Trust Layer using the trust relationships along one or more connection threads; and, evaluating for a First Member, the Professional Reputation and Trust Reference of a Second Member, wherein said accessing the Trust Reference from the at least one Trust Layer further comprising:

querying the at least one connected network of the at least one Trust Layer of the Professional Collaboration Network comprising trust linkages representing trust measures, of members of the at least one Professional Collaboration Network for the Second Member;

obtaining in response from the at least one Trust Layer, communications from a set of members—first level Trust Members—that provide a Trust Reference of the Second Member, wherein each First Level Trust Member has a pairwise relationship to the Second Member in one of said connection threads;

querying at least one Trust Layer of the Professional Collaboration Network comprising trust linkages representing trust measures members of the at least one Professional Collaboration Network for each of said First Level Trust Members;

obtaining in response from the at least one Trust Layer of the Professional Collaboration Network, communications from a set of members—Second Level Trust Members—that provide a Trust Reference of each of the First level Trust Members;

Iteratively as in the last two steps obtaining a chain of trust linkages with communications between corresponding $n^{th}$ and $(n+1)^{th}$ level Trust Members to provide a Trust Reference of the nth level Trust Member by the $(n+1)^{th}$ level Trust Member thereby building a connection thread;

terminating the backward chaining iterations of the last step when a predetermined number—M—of Trust Members of level (n+1) or less are determined to be the First Member, thereby generating M complete connection threads;

computing one or more aggregate trust measures with forward chaining from at least one of the resulting M or less, iterative Trust References available to the First Member.

2. A method for business decision support as in claim 1, wherein said First member is a member of a different Trust Layer of the at least one Trust Layer, to the Second Member.

3. A method for business decision support f as in claim 1, wherein Trust Reference Guarantees are provided for members of the Trust Layer wherein the (n+1)th level Trust Member offers a (n+1)th level Trust Reference Guarantee with a (n+1) Trust Payout and a (n+1) Trust Premium for the integrity of an $n^{th}$ level Trust Member and the $n^{th}$ level Trust Member offers a nth level Trust Reference Guarantee with a nth Trust Payout and a nth Trust Premium for the integrity of an $(n-1)^{th}$ level Trust Member wherein iteratively, the value of "n" changes along said connection thread to "0" as defined by the said Second Member along a Backward Chained complete connection thread and wherein the set of Reference guarantees from the (n+1)th level Trust Member to said Second Member creates a Forward Chain of Trust Reference Guarantees that support the reputation of the Second Member relative to the (n+1)th Trust Member with all of the Trust Payouts in the event of failure of the chain of reputations from the (n+1)th level Trust Member to the Second Member with a guaranteed connection thread.

4. A method for business decision support f as in claim 3, wherein said (n+1)th Trust Member is the First Member and the aggregate of said chain of Trust Premia for Trust Reference Guarantees are an Aggregate Trust Guarantee Premium paid by the First Member.

5. A method for business decision support as in claim 4, wherein the Trust Payouts of the guarantees is paid by each of said Guarantors through the Professional Collaboration Network, if the related Trust Reference proves not to predict outcome.

6. A method for business decision support as in claim 4, wherein a financial institution underwrites one or more of said Trust Reference Guarantees.

7. A method for business decision support as in claim 1, further comprising a bidding system wherein said First Member may publish specifications for participation of one or more of said members and invite bids for participation and thereafter utilize the Trust Layer and the Professional Layer to evaluate prospects in the context of bids received.

8. A method for business decision support as in claim 1, wherein said Trust Reference comprises one of a positive or negative reference.

9. A method for business decision support as in claim 1, wherein the First member is an investor and the Second Member is member requesting venture funding.

10. A method for business decision support as in claim 1, wherein an entrepreneur is a First Member enabled to utilize one or both of the evaluated Professional Reputation and Trust Reference of a Second Member to procure services, wherein the Second Member bids for providing the services comprising at least one of: intellectual property; capital; legal services; one or more professional fields; and marketing services.

11. A method for business decision support using a web server and client user interfaces for performance evaluation of human resources comprising professional ability and trust, utilizing an information network with a plurality of members wherein said members comprise a First Member and a Second Member—with a Professional Collaboration Network with at least one Professional layer and at least one Trust Layer, comprising:
  obtaining member information;
  establishing a Professional layer based on the member information comprising disclosed professional ability and pairwise professional relationships with other members of the Professional Layer;
  establishing a Trust Layer by utilizing a linkage search engine to identify linkages from member information comprising pairwise trust relationships with other members of the Trust layer from disclosed interactions between pairs of members resulting from prior or current personal contact;
  iteratively using such linkages between members, to create a chain of trust linkages that generate at least one connected network of members as a subset of the Trust Layer with each of said connected networks comprising members connected to every other member in said connected network through a series of pairwise connections between members, wherein each of said connected networks comprise one or more connection threads each of which is a unique path along said pair-wise linkages between any two of said members with any one pairwise linkage traversed only once;
  identifying a Trust Reference for members of said Trust layer utilizing the chain of trust relationships along one or more connection threads;
  accessing from the web server a Professional Reputation for at least one member, from the at least one Professional Layer with members wherein the professional ability of said members are assessed using third party knowledge of said members;
  accessing from the web server a Trust Reference for at least one member from the at least one Trust Layer using the trust relationships along one or more connection threads; and,
  evaluating for a First Member, the Professional Reputation and Trust Reference of a Second Member;
  wherein said accessing the professional ability of the Second Member from the Professional Layer comprises:
    creating a forum for interaction of the members and generating, threads for each discussion topic;
    visually representing on user screens components of professional fields of members along multiple axes with an origin representing multiple field types, wherein the distance from the origin represents the level of competence;
    visually representing on user screens each posting of each member on said forum with components of professional field content in the posting along multiple axes representing multiple field types, about an origin, wherein the distance from the origin represents the proportion of content in each relevant field;
    visually representing on user screens each response to a posting or another response of each member on said forum with components of professional field content In the posting along multiple axes representing multiple field types, about an origin, wherein the distance from the origin represents the proportion of content in each relevant field;
    thereby creating a tree defined by a sequence of responses each characterized by measures of multiple field strength components each representing a branch of the tree;
    accumulating the contributions of each member;
    representing on an attribute space for the set of all postings of the Second Member in the network;
    selecting a point or a region of the space to investigate the competence of the Second Member;
  thereby using the accumulated contributions of members to assess professional competence in any of the fields represented as dimensions.

12. A method for business decision support as in claim 11, wherein the termination of any branch of the tree on any thread provides information on the professional competence of the last contributor to the thread.

13. A method for business decision support using a web server and client user interfaces for performance evaluation of human resources comprising professional ability and trust, utilizing an information network with a plurality of members wherein said members comprise a First Member and a Second Member—with a Professional Collaboration Network with at least one Professional layer and at least one Trust Layer, comprising:
  obtaining member information;
  establishing a Professional layer based on the member information comprising disclosed professional ability and pairwise professional relationships with other members of the Professional Layer;
  establishing a Trust Layer by utilizing a linkage search engine to identify linkages from member information comprising pairwise trust relationships with other members of the Trust layer from disclosed interactions between pairs of members resulting from prior or current personal contact;
  iteratively using such linkages between members, to create a chain of trust linkages that generate at least one connected network of members as a subset of the Trust Layer with each of said connected networks comprising members connected to every other member in said connected network through a series of pairwise connections between members, wherein each of said connected networks comprise one or more connection threads each of which is a unique path along said pair-wise linkages between any two of said members with any one pairwise linkage traversed only once;
identifying a Trust Reference for members of said Trust layer utilizing the chain of trust relationships along one or more connection threads;
accessing from the web server a Professional Reputation for at least one member, from the at least one Professional Layer with members wherein the professional ability of said members are assessed using third party knowledge of said members;
accessing from the web server a Trust Reference for at least one member from the at least one Trust Layer using the trust relationships along one or more connection threads; and,
evaluating for a First Member, the Professional Reputation and Trust Reference of a Second Member, wherein evaluating a Professional Reputation for at least one member, from the at least one Professional Layer with members wherein the professional ability of said members are assessed using third party knowledge of said members, comprises:

establishing, a Professional Layer based on member information comprising pairwise professional relationships with other members of the Professional Layer from disclosed prior interactions between pairs of members, resulting in linkages generated by such interactions, thereby generating at least one connected network of members as a subset of the Professional Layer with each of said connected networks comprising members connected to every other member In said connected network through a series of pairwise connections between members, wherein each of said connected networks comprise one or more connection threads each of which is a unique path along said pair-wise linkages between any two of said members with any one pair-wise linkage traversed only once;

establishing a Professional Reference for members of said Professional layer utilizing the chain of professional relationships along one or more connection threads and wherein said evaluating the Professional Reference from the at least one the Professional Layer further comprising:

querying the at least one connected network of the at least one the Professional Layer of the Professional Collaboration Network comprising professional linkages representing professional measures, of members of the at least one Professional Collaboration Network for the Second Member;

obtaining in response from the at least one the Professional Layer, communications from a set of members—first level the Professional Members—that provides a the Professional Reference of the Second Member, wherein each First Level the Professional Member has a pairwise relationship to the Second Member in one of said connection threads;

querying at least one the Professional Layer of the Professional Collaboration Network comprising professional linkages representing professional measures members of the at least one Professional Collaboration Network for each of said First Level the Professional Members;

obtaining in response from the at least one the Professional Layer of the Professional Collaboration Network, communications from a set of members—Second Level the Professional Members—that provides a the Professional Reference of each of the First level the Professional Members;

iteratively as in the last two steps obtaining a chain of professional linkages with communications between corresponding $m^{th}$ and $(m+1)^{th}$ level the Professional Members to provide a the Professional Reference of the nth level the Professional Member by the $(m+1)^{th}$ level the Professional Member thereby building a connection thread;

terminating the Backward Chaining iterations of the last step when a predetermined number—P—of the Professional Members of level $(m+1)$ or less are determined to be the First Member, thereby generating M complete connection threads;

computing with Forward Chaining, one or more aggregate professional measures from at least one of the at resulting M or less, iterative the Professional References available to the First Member.

14. A method for business decision support as in claim 13, wherein Professional Reputation Guarantees are provided for members of the Professional Layer wherein the $(m+1)$th level Professional Member offers a $(m+1)$th level Professional Reputation Guarantee with a $(m+1)$ Professional Payout and a $(m+1)$ Professional Premium for the professional reputation of an $m^{th}$ level Professional Member and the $m^{th}$ level Professional Member offers a $m^{th}$ level Professional Reputation Guarantee with a mth Professional Payout and a mth Professional Premium for the professional reputation of an $(m-1)^{th}$ level Professional Member, and wherein iteratively, the value of "m" changes along said connection thread to "0" as defined by the said Second Member along a Backward Chained complete connection thread and wherein said professional reputation guarantees from the $(m+1)$th level Professional Member to the said Second Member creates a Forward Chain of Professional Reputation Guarantees that support the professional reputation of the Second Member relative to the $(m+1)$th Professional Member with all of the Payouts in the event of failure of the chain of professional reputations from the $(m+1)$th level Professional Member to the Second Member with a guaranteed connection thread.

15. A method for business decision support as in claim 14, wherein said $(m+1)$th Professional Member is the First Member and the aggregate of said chain of Professional Premia for Professional Reputation Guarantees are a Aggregate Professional Guarantee Premium paid by the First Member.

16. A method for business decision support as in claim 15, wherein the Professional Payouts of the guarantees is paid by each of said Guarantors through the Professional Collaboration Network, if the related Professional Reference proves not to predict outcome.

17. A method for business decision support as in claim 13, wherein said Professional layer comprises experts who can evaluate a member and are members of the at least one Professional Layer and therefore may have connection threads to the First Member and thereby enable a Professional Reference by the Professional Collaboration Network.

18. A method for business decision support as in claim 13, wherein the First member is an investor and the Second Member is member requesting venture funding.

19. A method for business decision support as in claim 13, wherein an entrepreneur is a First Member enabled to utilize one or both of the evaluated Professional Reputation and Trust Reference of a Second Member to procure services, wherein the Second Member bids for providing the services comprising at least one of: intellectual property; capital; legal services; one or more professional fields; and marketing services.

20. A method for business decision support using a web server and client user interfaces for performance evaluation of human resources comprising professional ability and trust, utilizing an information network with a plurality of members wherein said members comprise a First Member and a Second Member—with a Professional Collaboration Network (PCN), comprising:

obtaining of member information;

establishing member information comprising both of pairwise professional ability and trust relationships with other members of the PCN by utilizing a linkage search engine, executing on the web server, to identify linkages from member information comprising pairwise trust and professional relationships with other members from disclosed prior interactions between pairs of members, iteratively using such linkages between pairs of members, to create a chain of linkages that generate at least one connected network of members as a subset of the PCN with each of said connected networks comprising members connected to every other member in said connected network through a series of pairwise connections between members, wherein each of said connected networks comprise one or more connection threads each of which is a unique path along said pair-wise linkages between any two of said members with anyone pair-wise linkage traversed only once;

establishing both of a Professional Trust Reference and a Professional Reputation for members of said PCN utilizing the chain of professional and trust relationships along one or more connection threads;

querying, using the web server, the at least one connected network of the Professional Collaboration Network comprising professional linkages representing professional ability, and trust linkages representing trust measures, of members of the at least one Professional Collaboration Network for the Second Member;

obtaining in response from the PCN, communications from a set of members—first level Referee Members—that provides a Trust Reference and a Professional Reputation of the Second Member, wherein each First level Referee Member has a pairwise relationship to the Second Member in one of said connection threads;

querying of the Professional Collaboration Network comprising professional linkages representing professional ability, and trust linkages representing trust measures, members of the at least one Professional Collaboration Network for each of said First level Referee Members;

obtaining in response from the Professional Collaboration Network, communications from a set of members—Second level Referee Members—that provides a Trust Reference and a Professional Reputation of each of the First level Referee Members;

iteratively as in the last two steps obtaining a chain of trust linkages and professional linkages with communications between corresponding $p^{th}$ and $(p+1)^{th}$ level Referee Members to provide a Trust Reference and a Professional Reputation of the nth level Referee Members by the $(p+1)^{th}$ level Referee Members thereby building a connection thread;

terminating the Backward Chaining Iterations of the last step when a predetermined number—R—of Referee Members of level (p+1) or less are determined to be the First Member, thereby generating M complete connection threads;

computing, using the web server, one or more aggregate trust and professional measures with forward chaining from at least one of the resulting R or less, iterative Trust References and Professional Reputations available to the First Member thereby enabling the decision support system to evaluate for a First Member, the Professional Reputation and Trust Reference of a Second Member;

wherein Guarantees are provided for members of the PCN wherein the $(p+1)^{th}$ level Referee Member offers a $(p+1)^{th}$ level Guarantee with a (p+1) Payout and a (p+1) Premium for the integrity and professional competence of a $p^{th}$ level Trust Member contingent on the $p^{th}$ level Referee Member offering a $p^{th}$ level Guarantee with a $p^{th}$ payout and a $p^{th}$ premium for the integrity of a $(p-1)^{th}$ level Referee Member wherein thereby iteratively, the value of "p" changes along said connection thread to "0" as defined by the said Second Member along a Backward Chained complete connection thread and wherein said Guarantees from the $(p+1)^{th}$ level Referee Member to the said Second Member creates a Forward Chain of Guarantees that support the integrity and professional competence of the Second Member relative to the $(p+1)^{th}$ Referee Member with all of the Referee Members in the event of failure of the chain of reputations from the $(p+1)^{th}$ level Referee Member to the Second Member, and wherein the $(p+1)^{th}$ Referee Member is the First Member and the aggregate of said chain of Premia for Guarantees are a Aggregate Guarantee Premium paid by the First Member.

\* \* \* \* \*